(12) United States Patent
Nishio et al.

(10) Patent No.: US 7,597,021 B2
(45) Date of Patent: Oct. 6, 2009

(54) CONTROL APPARATUS OF VEHICULAR AUTOMATIC TRANSMISSION

(75) Inventors: Shinichi Nishio, Wako (JP); Hiroyuki Takeo, Wako (JP); Hideki Machino, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 667 days.

(21) Appl. No.: 11/235,780

(22) Filed: Sep. 27, 2005

(65) Prior Publication Data

US 2007/0186704 A1    Aug. 16, 2007

(30) Foreign Application Priority Data

Sep. 29, 2004    (JP)    ............... 2004-285249

(51) Int. Cl.
*B60K 20/00* (2006.01)
*B60K 17/04* (2006.01)
(52) U.S. Cl. ............. 74/473.18; 74/473.3; 74/473.12
(58) Field of Classification Search ........... 74/473.1, 74/473.12, 473.18, 473.3
See application file for complete search history.

(56) References Cited

U.S. PATENT DOCUMENTS 5,865,705 A * 2/1999 Shamoto et al. ............. 477/79
6,053,066 A * 4/2000 Ishii et al. ................. 74/473.18
6,474,186 B1 * 11/2002 Vollmar ...................... 74/335
2003/0101840 A1 * 6/2003 Yoshikawa et al. ........... 74/552
2004/0142794 A1 * 7/2004 Henneken et al. ........... 477/121

FOREIGN PATENT DOCUMENTS

| DE | 199 15 892 A1 | 10/1999 |
| DE | 102 01 606 A1 | 7/2003 |
| DE | 103 12 396 A1 | 10/2003 |
| EP | 1 094 250 A1 | 4/2001 |
| JP | 09-226403 | 9/1997 |
| JP | 10-047473 | 2/1998 |

* cited by examiner

*Primary Examiner*—Thomas R Hannon
*Assistant Examiner*—Justin Krause
(74) *Attorney, Agent, or Firm*—Rankin, Hill & Clark LLP

(57) ABSTRACT

A control apparatus of a vehicular automatic transmission includes a control device designed to control gear changes of the transmission on the basis of operation or control signals from a first manual gearshifting part and a second manual gearshifting part. When it determines a multiple operation of the first and second manual gearshifting parts, the control device executes the operation signal from the first manual gearshifting part.

3 Claims, 4 Drawing Sheets

CONTROL APPARATUS OF VEHICULAR AUTOMATIC TRANSMISSION

FIELD OF THE INVENTION

The present invention relates to control technology for manual mode switching of a vehicular automatic transmission (AT).

BACKGROUND OF THE INVENTION

Technology for raising engine braking effect, gear ratio response and vehicle travel performance by selecting gears in accordance with the wishes of a driver even in an automatic transmission has been proposed in for example JP-A-9-226403 and JP-A-10-47473. A gearshift operating device disclosed in JP-A-9-226403 will be described with reference to FIG. 4 and a control apparatus of an automatic transmission disclosed in JP-A-10-47473 will be described with reference to FIG. 5.

The gearshift operating device of JP-A-9-226403 shown in FIG. 4 has an UP/DOWN column 2 for gear ratio selection provided in the vicinity of a shift lever 1 and an UP-shift switch 3a and a DOWN-shift switch 3b provided on a steering wheel 3. A driver has the convenience of being able to operate the UP/DOWN column 2 or either of the UP-shift switch 3a and the DOWN-shift switch 3b.

However, there is a strong possibility of the driver touching the TIP-shift switch 3a and the DOWN-shift switch 3b provided on the steering wheel 3 unintentionally while steering, and accidental operation occurs easily.

In a control flow chart of the automatic transmission control device of JP-A-10-47473 shown in FIG. 5, in a step SA7, it is determined whether or not a plurality of shift switches are ON (multiple inputs). When it is determined that there are multiple inputs, it is then determined in step SA9 whether or not the inputs are of the same type. When the multiple inputs are of the same type, in step SA10 they are processed as a single gearshift operation, and in step SA11 a single gear change is executed. This control flow has the advantage that even if a plurality of operations are carried out by mistake, because only one gearchange is executed, there is no risk of a sharp succession of gearchanges taking place.

However, when the shift lever is operated, it can happen that the body of the driver touches a shift switch on the steering wheel side at the same time. When the content of the operation on the shift lever side and the content of the operation of the switch touched on the steering wheel side differ, in the control flow of FIG. 5, processing proceeds to step SA12 and step SA13 and a gearchange operation is not carried out. But with this, good travel cannot be expected, and technology for correcting accidental operation has been needed.

SUMMARY OF THE INVENTION

According to an aspect of the present invention, there is provided a control apparatus for a vehicular automatic transmission, which comprises: a first manual gearshifting part comprised of a first UP switch and a first DOWN switch provided on a shift lever; a second manual gearshifting part comprised of a second UP switch and a second DOWN switch provided at a location remote from the shift lever; and a control device for controlling gearchanges of the transmission on the basis of an operation signal outputted from the first manual gearshifting part and an operation signal outputted from the second manual gearshifting part, wherein the control device executes the operation signal from the first manual gearshifting part when the control device detects a multiple operation of the first and second manual gearshifting parts.

When while the vehicle is traveling the driver operates the shift lever, he removes one of his hands gripping the steering wheel to operate the shift lever. It can be assumed that a first manual gearshifting part provided on the shift lever like this has been operated intentionally by the driver. On the other hand, the second manual gearshifting part provided somewhere other than on the shift lever may be operated unintentionally by the driver. Accordingly, in this invention, control is performed so that the first manual gearshifting part, which is based more closely on the intention of the driver, is given priority over the second manual gearshifting part. Consequently, even if the second manual gearshifting part is operated by mistake, the gear can be shifted in accordance with the intention of the driver, and good travel can be maintained. As a result, the ease of use of the manual gearshifting parts of an automotive vehicle having manual gearshifting parts in two locations can be improved.

Preferably, the second manual gearshifting part is provided on the steering wheel or in the vicinity thereof. In this case, the second manual gear-shifting part is located near the fingertips of the driver and can be operated easily. Although this also means that the second manual gearshifting part is easily operated by mistake, because the first manual gearshifting part is given priority, the effect of accidental operations can be eliminated.

In a preferred form, the control device determines the multiple operation when a subsequent operation signal is received in a predetermined time from receipt of the operation signal from the first or second manual gearshifting part. "Multiple operation" refers to two switches being operated simultaneously or almost simultaneously. The "almost simultaneously" may be defined with a time. As a result, distinction between a multiple operation and a non-multiple operation becomes clear, and the relevant determination logic in the control device is made simple.

BRIEF DESCRIPTION OF THE DRAWINGS

A preferred embodiment of the present invention will now be described in detail, by way of example only, with reference to the accompanying drawings, in which.

DETAILED DESCRIPTION OF THE PREFERRED EMBODIMENT

Figure 1:
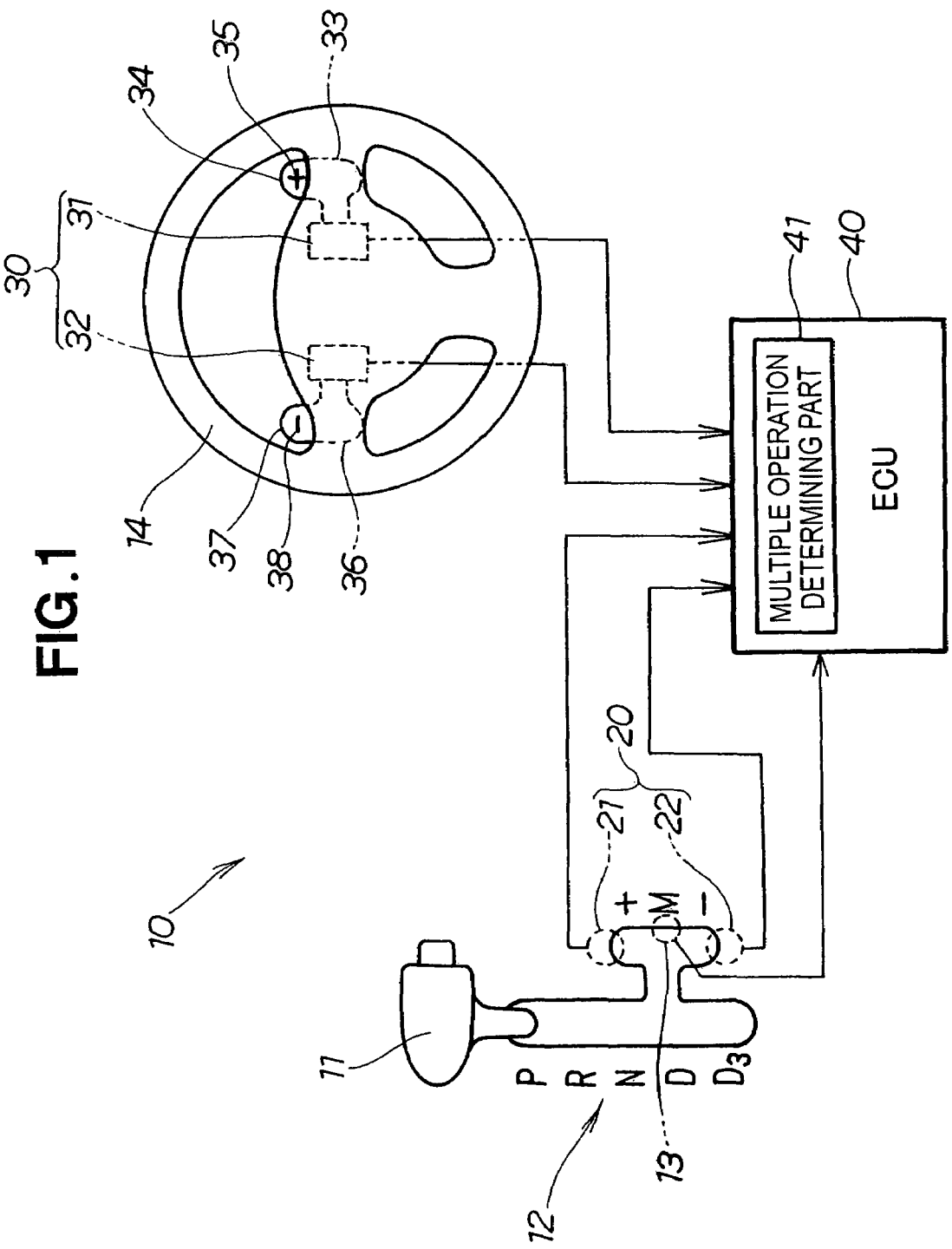
FIG. 1 is a schematic view of a control apparatus for a vehicular automatic transmission, according to the present invention.

As shown in FIG. 1, a control apparatus 10 of a vehicular automatic transmission, according to the present invention, has a manual gearshift mode selecting switch 13 and a first manual gearshifting part 20 provided in a shift lever control part 13 (hereinafter sometimes abbreviated to shift lever 11) having a shift lever 11 as its main part; a second manual gearshifting part 30 provided somewhere other than on the shift lever 11, for example on a steering wheel 14; and a vehicle ECU 40 including a multiple operation determining part 41 for determining that a multiple operation has been carried out when the first manual gearshifting part 20 and the second manual gearshifting part 30 are operated multiply.

When the shift lever 11 in the D position is tilted to an 'M' side, the manual gearshift mode selecting switch 13 detects this operation and issues an operation signal to the ECU 40. This manual gearshift mode selecting switch 13 may be a mechanical sensor, an optical sensor or an electrical sensor, and may be a contact sensor or a non-contact sensor.

The first manual gearshifting part 30 consists of a first UP switch 21 and a first DOWN switch 23. For example when with the shift lever 11 tilted to the 'M' side it is then pushed to a '+' side an operation signal is issued from the first UP switch 31, and when with the shift lever 11 tilted to the 'M' side it is pushed to a '−' side an operation signal is issued from the first DOWN switch 23.

The first UP switch 21 and the first DOWN switch 33 may be contact-type switches such as limit switches or non-contact switches such as Hall devices or photoelectric switches. And, individual switches may be dispensed with by signals corresponding to a first UP switch 21 and a first DOWN switch 22 being issued from a sensor monitoring the movements of the shift lever 11. In short, as long as they can produce control signals corresponding to a first UP switch 21 and a first DOWN switch 33, the switches may be of any type and form.

The second manual gearshifting part 30 consists of a second UP switch 31 and a second DOWN switch 33. For example, the second UP switch 31 may suitably be a sensor (such as a paddle sensor) actuated by a lever 33 mounted on the back of the right side of the steering wheel 14, rockably in the front-rear direction in the figure. The lever 33 is disposed on the rear side of the steering wheel 14 and rocked by being pulled forward in the figure by a finger of the driver's right hand, and one control signal from the second UP switch 31 is issued for each one such rocking of the lever 33. The lever 33 is provided with a projecting part 34 that is visible to the driver. A '+' symbol 35 is provided on this projecting part 34.

Similarly, the second DOWN switch 32 may suitably be a sensor (such as a paddle sensor) actuated by a lever 36 mounted on the back of the left side of the steering wheel 14, rockably in the front-rear direction in the figure. The lever 36 is disposed on the rear side of the steering wheel 14 and rocked by being pulled forward in the figure by a finger of the driver's left hand, and one control signal from the second DOWN switch 33 is issued for each one such rocking of the lever 36. The lever 36 is provided with a projecting part 37 that is visible to the driver. A '−' symbol 38 is provided on this projecting part 37.

Because the levers 33 and 36 do not protrude to the left or right from the steering wheel 14, as shown in the figure, accidental operation by the driver's elbow or palm of the hand touching them does not readily occur. However, because they are in positions where the driver's fingers gripping the steering wheel 14 can touch them, there is a possibility of them being accidentally operated by being touched by a finger.

The second UP switch 31 and the second DOWN switch 32 also may be contact-type switches such as mechanical switches or non-contact switches such as Hall devices or photoelectric switches. In short, as long as they can produce control signals corresponding to a second UP switch 31 and a second DOWN switch 32, the switches may be of any type and form.

Also, although in this preferred embodiment an example is shown wherein the second UP switch 31 and the second DOWN switch 32 are provided on the steering wheel 14, alternatively they may be mounted on an instrument panel in the vicinity of the steering wheel 14. Thus the second UP switch 31 and the second DOWN switch 32 can be mounted either on the steering wheel 14 (including its front and rear sides) or in the vicinity of the steering wheel 14. When this is done, the driver can operate the second UP switch 31 and the second DOWN switch 32 with small movements.

The vehicle ECU 40, having the multiple operation determining part 41, executes the control operation shown in Table 1.

TABLE 1

| Pattern | Manual mode selection switch | First manual gearshifting part | | Second manual gearshifting part | | Control operation content | |
|---|---|---|---|---|---|---|---|
| | | First UP switch | First DOWN switch | Second UP switch | Second DOWN switch | UP shift | DOWN shift |
| 1 | ON | ON | — | ON | — | ○ | — |
| 2 | ON | — | ON | — | ON | — | ○ |
| 3 | ON | ON | — | — | ON | ○ | — |
| 4 | ON | — | ON | ON | — | — | ○ |
| 5 | ON | ON | — | ON | ON | ○ | — |
| 6 | ON | — | ON | ON | ON | — | ○ |

The manual gearshift mode selecting switch 13 shown in FIG. 1 is ON as a common condition throughout Table 1.

Pattern 1: when the first UP switch 31 is ON and the second UP switch 31 is on, the shift lever 11 side is given priority and an UP-shift control operation is executed on the basis of the operation signal from the first UP switch 21.

Pattern 2: when the first DOWN switch 33 is ON and the second DOWN switch 33 is ON, the shift lever 11 side is given priority and a DOWN-shift control operation is executed on the basis of the operation signal from the first DOWN switch 22.

Pattern 3: when the first UP switch 31 is ON and the second DOWN switch 33 is ON, the shift lever 11 is given priority and an UP-shift control operation is executed on the basis of the operation signal from the first UP switch 21.

Pattern 4: when the first DOWN switch 33 is ON and the second UP switch 31 is ON, the shift lever 11 is given priority and a DOWN shift control operation is executed on the basis of the operation signal from the first DOWN switch 23.

In the example shown in FIG. 1, structurally it is possible for the left and right levers 33 and 36 to be rocked simultaneously, and when this happens there is a possibility of the second UP switch 31 and the second DOWN switch 33 both turning ON. Accordingly, the control content of Patterns 5 and 6 is added.

Pattern 5: when the first UP switch 31 is ON, the second UP switch 31 is ON and the second DOWN switch 32 is ON, the shift lever 11 is given priority and an UP-shift control operation is executed on the basis of the operation signal from the first UP switch 31.

Pattern 6: when the first DOWN switch 32 is ON, the second UP switch 31 is ON and the second DOWN switch 32 is ON, the shift lever 11 is given priority and a DOWN-shift control operation is executed on the basis of the operation signal from the first DOWN switch 32.

Figure 2:
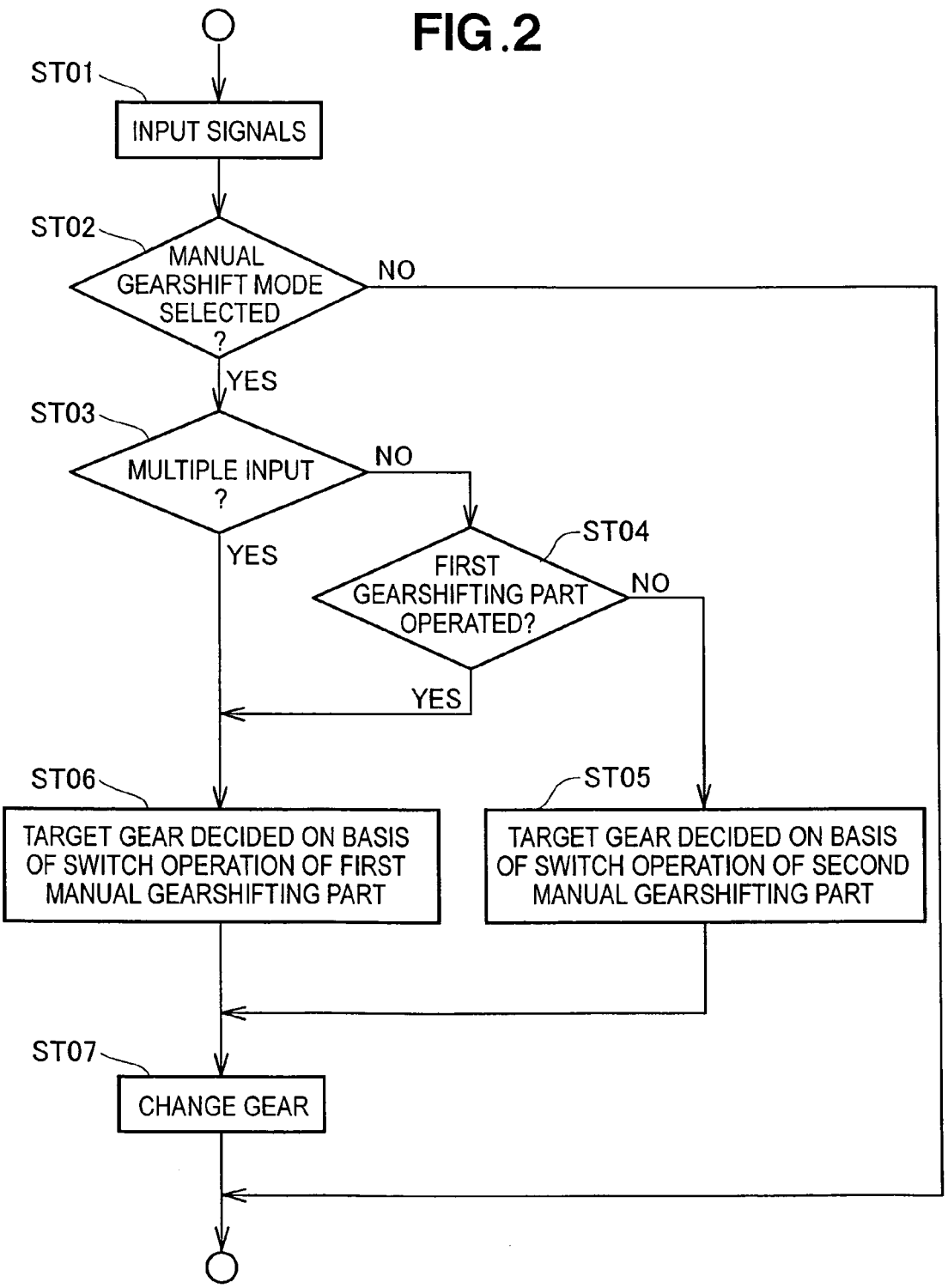
FIG. 2 is a flowchart of the control apparatus shown in FIG. 1.

The operation of a control apparatus of an automatic transmission constructed as described above will now be described on the basis of the flow chart shown in FIG. 2.

Step (hereinafter abbreviated to ST) 01: One or more control signals is inputted from the first UP switch 31, the first DOWN switch 33, the second UP switch 31 and the second DOWN switch 32.

ST02: It is determined whether or not the manual gearshifting mode has been selected. If not, processing ends. If the manual gearshifting mode has been selected, processing proceeds to ST03.

ST03: It is checked whether or not more than one control signal has been inputted. If not, because the number of control signals is 1 and there is no multiple input, processing proceeds to ST04.

ST04: It is checked whether or not the inputted control signal is from the first manual gearshifting part 30 (the first UP switch 31 or the first DOWN switch 23). If not, processing proceeds to ST05.

ST05: Because it has been determined in ST04 that the inputted control signal is not from the first manual gearshifting part 20, it is determined that the inputted control signal is from the second manual gearshifting part 30, and a target gear is decided on the basis of the switch operation of the second manual gearshifting part 30 (the second UP switch 31 or the second DOWN switch 33).

ST06: When it is determined in ST03 that there has been a multiple input, or when it has been determined in ST04 that there has been no multiple input but the first manual gearshifting part 20 has been operated, a target gear is decided on the basis of the switch operation of the first manual gearshifting part 30 (the first UP switch 31 or the first DOWN switch 23).

ST07: A control command executing a gear shift to the target gear decided in ST05 or ST06 is issued.

Now, it can happen that for example the driver operates the first manual gearshifting part 20 and 1.0 second thereafter the driver unintentionally touches a switch of the second manual gearshifting part 30. At this time, if a gear shift is executed with the target gear decided on the basis of the switch operation of the first manual gearshifting part 20 and then 1 second later a gear shift is executed with a target gear decided on the basis of the switch operation of the second manual gearshifting part 30, the gearshift frequency will rise and the load on the automatic transmission will increase.

Figure 3:
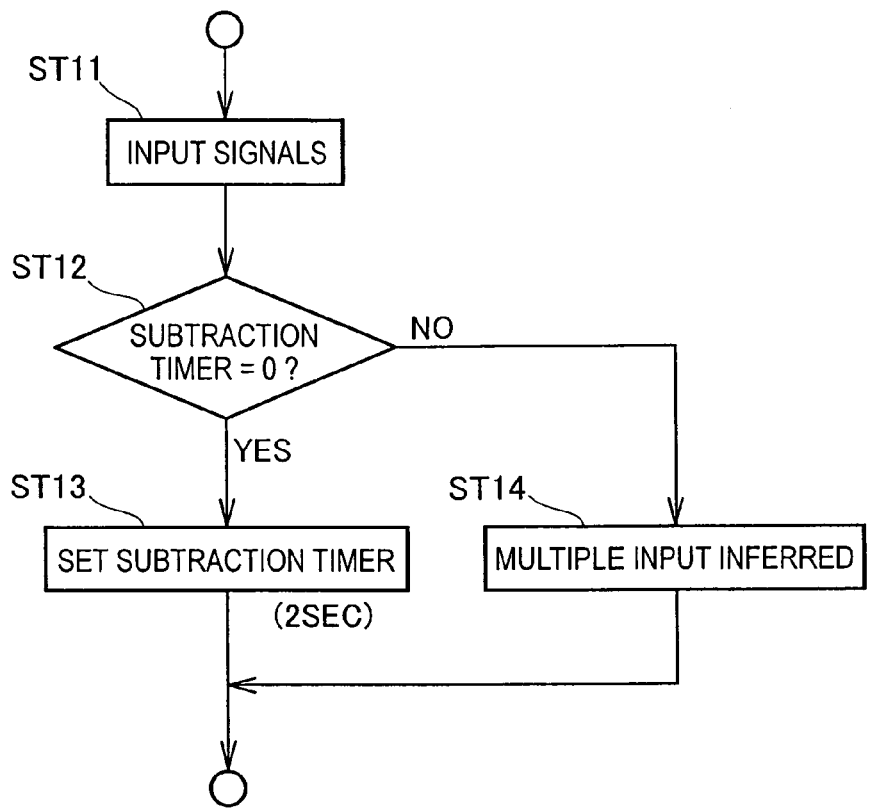
FIG. 3 is a flowchart of multiple input determination.
Figure 4:
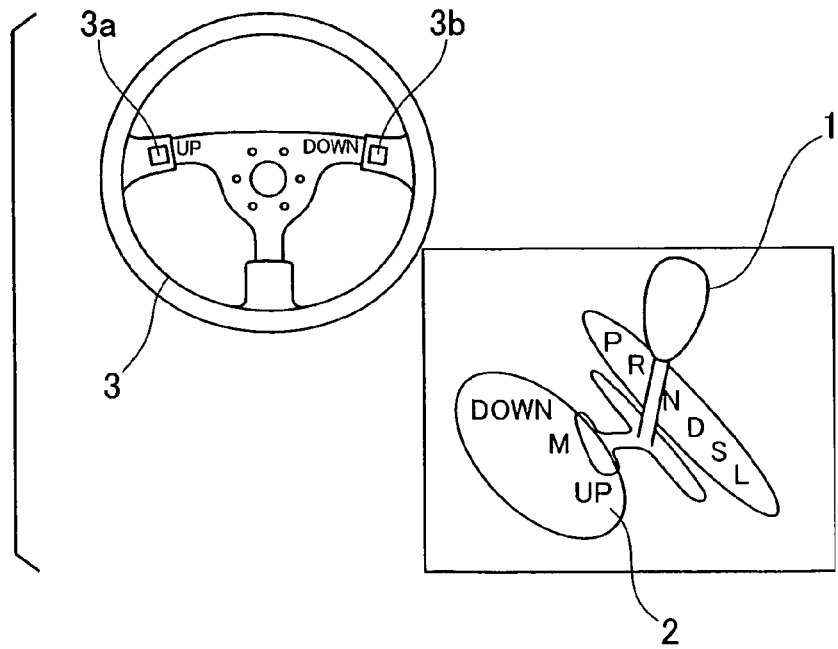
FIG. 4 schematically illustrates gearshift operation devices in related art.
Figure 5:
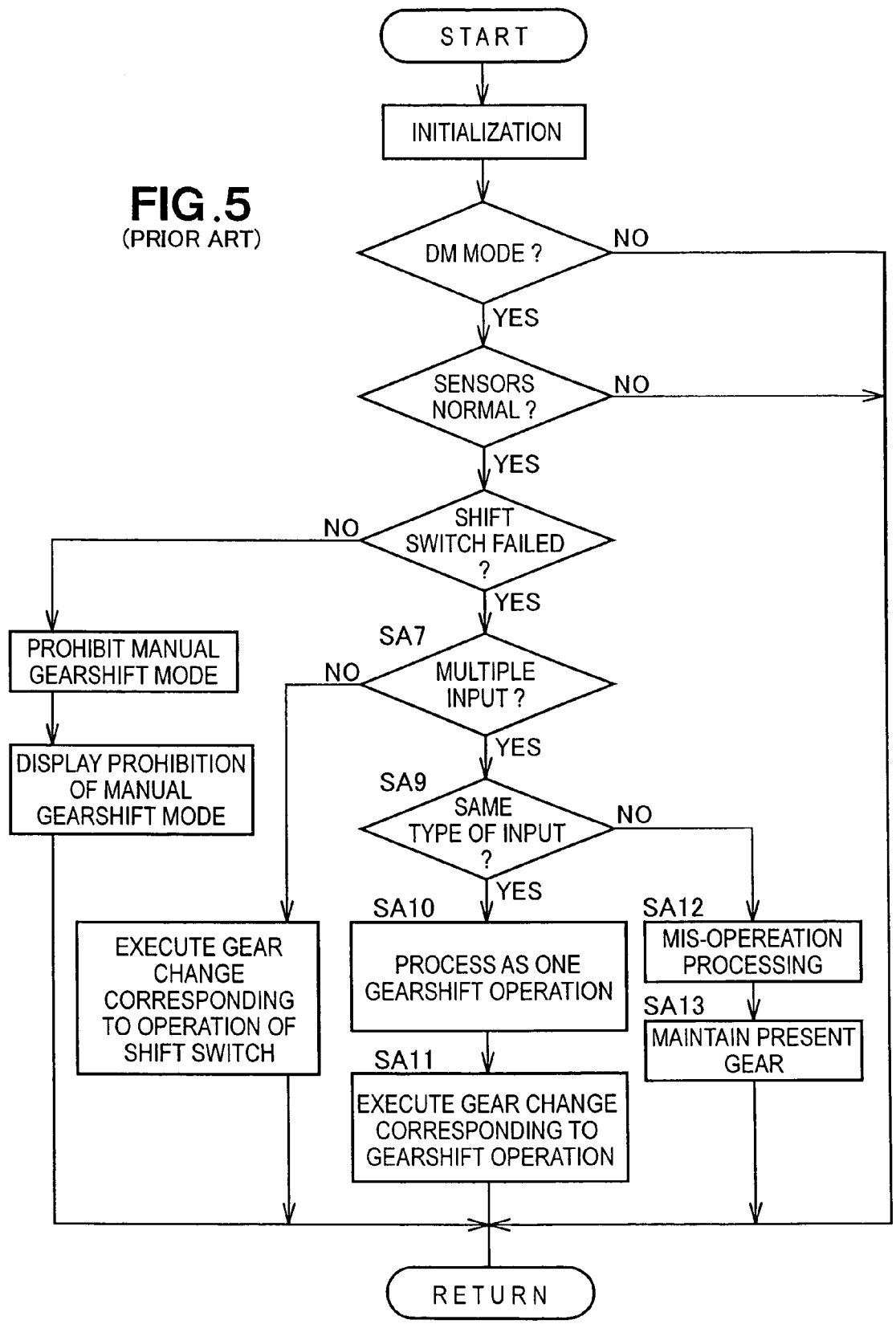
FIG. 5 is a view showing a flowchart of a conventional control apparatus of an automatic transmission.

One example of a countermeasure to this is that of making it take a certain time for multiple signal inputs to be accepted. A specific example of this will now be explained on the basis of the flow chart shown in FIG. 3.

ST11: The flow starts with the inputting of control signals from the first UP switch 21, the first DOWN switch 23, the second UP switch 31 and the second DOWN switch 32.

ST 13: The first time, because a subtraction timer is at 0, processing proceeds to ST13.

ST13: The subtraction timer is set to a predetermined time (for example 2 seconds). If there is no further signal input within the count of the predetermined time, the subtraction timer reaches O. Naturally, the signal in ST11 (the first signal) becomes effective.

If there is an input of a subsequent signal during the count of the predetermined time, processing proceeds to ST11, ST13. In ST13, because the subtraction timer has not reached 0, the determination is negative and processing proceeds to ST 14.

ST 14: It is determined that a first signal and a subsequent signal have been inputted multiply.

This multiple input determination flow is just an example, and as long as it can be determined that there has been a multiple input when there is more than one signal input within a predetermined time, any determination flow may be used.

An automatic transmission for an automotive vehicle, to which the invention is to be applied, may be a continuously variable transmission (CAT) using variable pulleys, a mechanism by which the gear of a manual transmission is changed automatically using a hydraulic actuator or the like (AMT), or an automatic transmission similar to these.

Obviously, various minor changes and modifications of the present invention are possible in the light of the above teaching. It is therefore to be understood that within the scope of the appended claims the invention may be practiced otherwise than as specifically described.

What is claimed is:

1. A control apparatus for a vehicular automatic transmission, comprising:
   a first manual gearshifting part comprised of a first up switch and a first down switch provided on a shift lever;
   a second manual gearshifting part comprised of a second up switch and a second down switch provided at a location remote from the shift lever; and
   a control device for controlling gearchanges of the transmission based on an operation signal outputted from the first manual gearshifting part and an operation signal outputted from the second manual gearshifting part,
   wherein the control device includes a multiple operation determining part for determining that a multiple operation of the first manual gearshifting part and the second manual gearshifting part has occurred, and
   wherein when the operation signals from the first manual gearshifting part and the second manual gearshifting part are executed simultaneously or almost simultaneously, the multiple operation determining part determines the occurrence of a multiple operation and the control device executes the operation signal of the first manual gear shifting part at all times.

2. The control apparatus according to claim 1, wherein the second manual gearshifting part is provided on a steering wheel.

3. The control apparatus according to claim 1, wherein the control device determines the multiple operation when a subsequent operation signal is received in a predetermined time from receipt of the operation signal from the first or second manual gearshifting part.

* * * * *

UNITED STATES PATENT AND TRADEMARK OFFICE
CERTIFICATE OF CORRECTION

| | | |
|---|---|---|
| PATENT NO. | : 7,597,021 B2 | Page 1 of 1 |
| APPLICATION NO. | : 11/235780 | |
| DATED | : October 6, 2009 | |
| INVENTOR(S) | : Nishio et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1041 days.

Signed and Sealed this
Third Day of May, 2011

David J. Kappos
*Director of the United States Patent and Trademark Office*